(12) United States Patent
Dow et al.

(10) Patent No.: US 7,079,181 B2
(45) Date of Patent: *Jul. 18, 2006

(54) APPLIANCE AND METHOD OF USING SAME HAVING A DELETE CAPABILITY FOR SAVED DATA

(75) Inventors: James C. Dow, Fort Collins, CO (US); Dan L. Dalton, Greeley, CO (US); Michael L. Rudd, Fort Collins, CO (US); Karin C. Ruffatto, Fort Collins, CO (US); Daniel Formosa, Montvale, NJ (US); Sandra Nieves, New York, NY (US); Paul Hamburger, New York, NY (US); Michael J. DeVries, Loveland, CO (US); Nancy Shepard, Arvada, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 770 days.
This patent is subject to a terminal disclaimer.

(21) Appl. No.: 10/061,061

(22) Filed: Jan. 29, 2002

(65) Prior Publication Data
US 2002/0126323 A1     Sep. 12, 2002

Related U.S. Application Data

(62) Division of application No. 09/588,944, filed on Jun. 7, 2000, now Pat. No. 6,496,284.

(51) Int. Cl.
*H04N 5/76* (2006.01)
(52) U.S. Cl. .............................. 348/231.1; 348/333.02
(58) Field of Classification Search ............. 348/207.1, 348/231.99, 231.1, 333.02, 333.04, 333.06, 348/333.11, 211.2; 345/473; 715/864, 859, 715/861, 977; 368/46
See application file for complete search history.

(56) References Cited

U.S. PATENT DOCUMENTS 5,481,303 A * 1/1996 Uehara ..................... 348/231.1
5,576,840 A * 11/1996 Fukushima .................. 386/46

(Continued)

OTHER PUBLICATIONS

Illingworth, Valerie, "A Dictionary of Computing", 1997, New York Oxford University Press. MeFedries, Paul, "WIndows 98 Unleashed", May 12, 1998, Sams Publishing.*
Gookin, Dan. "Dan Gookin Teaches Windows 98", 1998, Que, pp. 257-579.*

(Continued)

*Primary Examiner*—Ngoc-Yen Vu
*Assistant Examiner*—Brian Jelinek (57) ABSTRACT

A hand-held image capture and communication appliance and method of using same are provided wherein images may be captured and saved in an internal memory. The appliance includes a processor for manipulating and exhibiting the images on a built-in display screen. Program code stored in the internal memory and executed by the processor includes a delete page module for purging the memory of captured images when they are no longer needed. The delete page module includes a code segment for displaying an animation, which, in the preferred embodiment, is designed to convey the concept to the user that a delete operation is irreversible. One implementation of the animation shows the deleted page or group of pages turn into ashes, which is a metaphor for the permanence of the delete operation. A confirmation prompt is provided prior to carrying out the delete operation to inform the user how many pages or images will be deleted and what percentage of memory will be freed. In addition, the confirmation prompt allows further consideration by the user before the delete request is fulfilled.

14 Claims, 9 Drawing Sheets

U.S. PATENT DOCUMENTS

| | | | | |
|---|---|---|---|---|
| 5,596,694 A | * | 1/1997 | Capps | 345/473 |
| 5,666,159 A | * | 9/1997 | Parulski et al. | 348/211.2 |
| 5,677,843 A | * | 10/1997 | Mizuno et al. | 700/138 |
| 6,249,316 B1 | * | 6/2001 | Anderson | 348/333.05 |
| 6,429,896 B1 | * | 8/2002 | Aruga et al. | 348/231.99 |

OTHER PUBLICATIONS

MeFedries, Paul, "Windows 98 Unleashed", May 12, 1998, Sams Publishing.*

* cited by examiner

APPLIANCE AND METHOD OF USING SAME HAVING A DELETE CAPABILITY FOR SAVED DATA

CROSS REFERENCE TO RELATED APPLICATIONS

This application is a divisional of U.S. Utility Application entitled, "APPLIANCE AND METHOD OF USING SAME HAVING A DELETE CAPABILITY FOR SAVED DATA," Ser. No. 09/588,944, filed Jun. 7, 2000, now issued as U.S. Pat. No. 6,496,284 issued on Dec. 17, 2002, which is entirely incorporated herein by reference.

This application is also related to U.S. application entitled "APPLIANCE AND METHOD OF USING SAME HAVING A SEND CAPABILITY FOR STORED DATA,"; now issued as U.S. Pat. No. 6,396,518 issued on Dec. May 28, 2002; U.S. application entitled "APPLIANCE AND METHOD OF USING SAME HAVING A USER HELP CAPABILITY," now issued as U.S. Pat. No. 6,549,304 issued on Apr. 15, 2003; U.S. application entitled "APPLIANCE AND METHOD OF USING SAME HAVING A CAPABILITY TO GRAPHICALLY ASSOCIATE AND DISASSOCIATE DATA WITH AND FROM ONE ANOTHER," now issued as U.S. Pat. No. 6,469,689 issued on Oct. 22, 2002; U.S. application entitled "APPLICATION AND METHOD FOR COMMUNICATING AND VIEWING MULTIPLE CAPTURED IMAGES," now issued as U.S. Pat. No. 6,611,291 issued on Aug. 26, 2003; U.S. application entitled "APPLIANCE AND METHOD OF USING SAME FOR CAPTURING IMAGES," now issued as U.S. Pat. No. 6,466,231 issued on Oct. 15, 2002; and U.S. application entitled "APPLIANCE AND METHOD FOR VIEWING CAPTURED IMAGES," now issued as U.S. Pat. No. 6,441,927 issued on Aug. 27, 2002, which are all entirely incorporated herein by reference.

This application is also related to U.S. Pat. No. 6,292,273 B1, which is entitled "APPLIANCE AND METHOD OF USING SAME HAVING A DELETE CAPABILITY FOR SAVED DATA"; U.S. Pat. No. 6,232,973 B1, which is entitled "APPLIANCE AND METHOD FOR NAVIGATING AMONG MULTIPLE CAPTURED IMAGES AND FUNCTIONAL MENUS"; U.S. Pat. No. 6,301,020, which is entitled "APPLIANCE AND METHOD FOR CAPTURING IMAGES HAVING A USER ERROR INTERFACE"; and U.S. Pat. No. 6,160,926, which is entitled "APPLIANCE AND METHOD FOR MENU NAVIGATION," which are incorporated herein by reference.

BACKGROUND OF THE INVENTION

The present invention relates generally to the field of graphical user interfaces, and, more particularly, to a portable hand-held appliance for capturing images through digital scanning that has a graphical user interface for displaying the captured images for user manipulation and processing, and communicating those images to another device or appliance.

Intangible information is a vital business asset that can be exploited for competitive advantage if managed properly. In the past fifteen years, improvements in information processing have been achieved primarily from the widespread use of microcomputers in the workplace and their application in local and wide area networks. Through such applications as electronic mail (email) and networked access to document storage servers, the electronic communications market has exploded. Nevertheless, business is still far from reaching a "paperless" workplace. For example, according to a 1993 report by BIS Strategic Decisions (hereinafter BIS), an information technology consulting firm, more than 90 billion documents were created in 1992 and more than 1 trillion copies of those documents were made. Moreover, BIS estimated that printing and copying expenses average between 6% and 13% of a typical company's revenue. These statistics illustrate the economic savings available for those businesses that are able to merge paper and technology in a unified information processing strategy.

One tool that has proven useful for translating between paper and electronic information is the digital scanner. Scanner-enabled document distribution endows paper-based documents with the speed and convenience of electronic communications. A desktop scanner or network scanner allows business professionals to scan paper-based documents, manage them effectively and distribute them in a timely fashion. Users can share and distribute information easily by scanning directly to their email or personal computer (PC) fax applications. The growing popularity of fax modems and email is driving the acceptance of scanner-enabled document distribution in offices of all sizes. Fax/modem capabilities, which are available with virtually all modem PCs, enable users to send and receive faxes directly from a computer—at their desk or while traveling—and to check email remotely.

Nevertheless, while scanners are ideal for users who need to disseminate paper-based information to colleagues through PC facsimile and/or email, traditional flatbed scanners lack the convenience and flexibility that users have become accustomed to through such products as notebook computers and cellular phones. Hand-held scanners are an improvement in this regard; however, they are typically dependent on a host computer for displaying the scanned images and for providing power. U.S. Pat. No. 5,550,938 to Hayakawa et al. (hereinafter Hayakawa) discloses a portable image scanner designed to overcome these disadvantages. Specifically, Hayakawa discloses a hand-held cordless image scanner having a display/control screen, a memory for storing scanned images, a self contained power supply and an interface that allows the scanner to be received by a host computer as a memory card for transferring stored images from the scanner to the computer. While Hayakawa's scanner is effective in breaking the dependency on a host computer for image display and power, it still has several drawbacks. For example, Hayakawa's scanner offers no image processing features other than the capabilities of storing or discarding a newly scanned image and reviewing those images that have been stored previously. More advanced image processing would necessarily be done after transfer to a host computer. Moreover, Hayakawa does not offer a graphical user interface (GUI) containing icons and/or animations to assist users in operating their device. Finally, transfer of images is limited to those devices having ports for receiving an external memory card or the capability of reading the scanner memory through a memory card drive.

Accordingly, what is sought is a portable, hand-held image capturing device that allows users to process or manipulate captured images in the device and the ability to communicate the images directly to some other unit such as a computer, printer, or facsimile machine. In addition, the image capturing device should provide cordless operation and use a standard interface for transferring images to other devices. A GUI is preferred to assist users, particularly novices, in operating the device.

SUMMARY OF THE INVENTION

Certain novel features and advantages of the invention will be set forth in the description that follows and will become apparent to those skilled in the art upon examination of the following or may be learned with the practice of the invention.

To achieve the novel features and advantages, the present invention is generally directed to a portable hand-held image capture and communication appliance and method of using same by which images may be captured via capturing means and saved in an internal memory. The appliance includes a processor for manipulating and exhibiting the images on a built-in display screen. Program code stored in the internal memory and executed by the processor includes a delete page module for purging the memory of captured images when they are no longer needed.

According to an aspect of the invention, the delete page module includes a code segment for displaying an animation. In the preferred embodiment, the animation is designed to convey the concept to the user that a delete operation is irreversible. That is, once an image is deleted from memory, it cannot be recovered. One possible implementation of the animation shows the deleted page or group of pages turn into a pile of burnt ashes, which is a metaphor for the permanence of the delete operation.

According to another aspect of the invention, the delete page module includes a code segment for providing the user with a confirmation prompt prior to carrying out the delete operation. This prompt informs the user how many pages or images will be deleted and what percentage of memory will be freed to allow the user to pause and consider further whether to proceed with the operation.

For convenience, the program code includes a menu/navigation module that provides the user with a list of delete page options through a GUI and processes any user selection thereof. In the preferred embodiment, three options are provided: delete the current page or image on display, delete the group of pages of which the current page on display is a member, or delete all pages in memory.

The appliance according to the present invention has many advantages, a few of which are highlighted hereafter, as examples.

One advantage of the invention is that intelligent image processing features, normally reserved for a traditional computer, are provided in a portable, hand-held image capturing appliance.

Another advantage of the invention, is that when a user desires to delete a page or image stored in memory, a confirmation prompt is provided to prevent image data from being deleted inadvertently.

Still another advantage of the invention is that the delete operation is accompanied by an animation, which conveys to the user the permanence or irreversibility of the action taken.

Yet another advantage of the invention is that a GUI is provided, which allows new users to operate the appliance with minimal training or assistance.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Architecture of the Image Capture and Communication Appliance

Figure 1A:
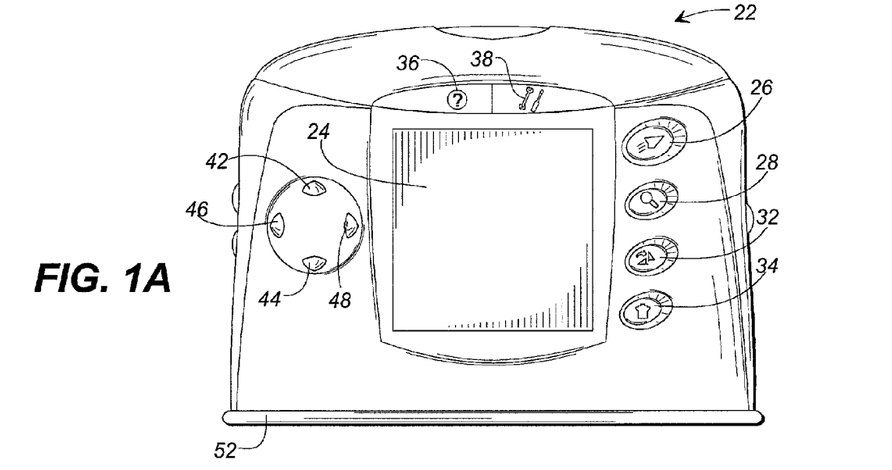
FIG. 1A is an elevation view of the hand-held image capture and communication appliance according to the present invention, which depicts a side of the unit containing the display screen, operation buttons, and navigation buttons.

A portable, hand-held, image capture and communication appliance 22 embodying the principles of the present invention is shown in FIGS. 1A through 1D. Specifically, FIG. 1A depicts one side (i.e., front) of appliance 22 where a flat-panel display 24 along with user operation buttons 26, 28, 32, 34, 36, 38 and user navigation buttons 42, 44, 46, 48 are located. Display 24 is preferably of the flat-panel variety to accommodate the hand size dimensions of appliance 22. Common types of flat-panel displays suitable for use in the present invention include electroluminescent displays, gas plasma discharge displays, and liquid crystal displays (LCDs). Display 24 is the means by which information, including captured images, text, icons, and animations, is communicated to the user. As used herein, the term "image" encompasses both text (binary) and color, graphic, or grayscale visuals. The user operation buttons comprise an image send or transmit button 26, an image zoom button 28, an image rotate button 32, an image delete button 34, a help utility button 36 and a tools menu button 38. Send, zoom, rotate, and delete buttons 26, 28, 32 and 34 allow the user to electronically manipulate an image or page that has been captured into memory through photoelement array 52. Note that an image captured in memory is interchangeably referred to herein as a "page" because the image is portrayed in appliance 22 as a physical page of text and/or imagery. Activation of tools button 38 presents the user with a menu that includes possible image operations (e.g., image attachment/grouping, image detachment/ungrouping), changing the mode of appliance 22 (i.e., toggling between text (binary) capture and color, graphic, or grayscale capture modes), calibrating appliance 22, displaying a screen identifying important specifications such as a model number, hardware or software release number, memory equipage, etc., or other user utilities not deserving of a dedicated external button for activation. Help button 36 provides the user with access to general tutorials, process animations, how-to instructions on the operation of appliance 22, and context sensitive instruction when help is requested while another operation or menu is active. The navigation buttons include an up button 42, a down button 44, a left button 46, and a right button 48 and are controlled by the user to steer a course through menu items and to view images or pages that have been captured in memory.

Figure 1B:
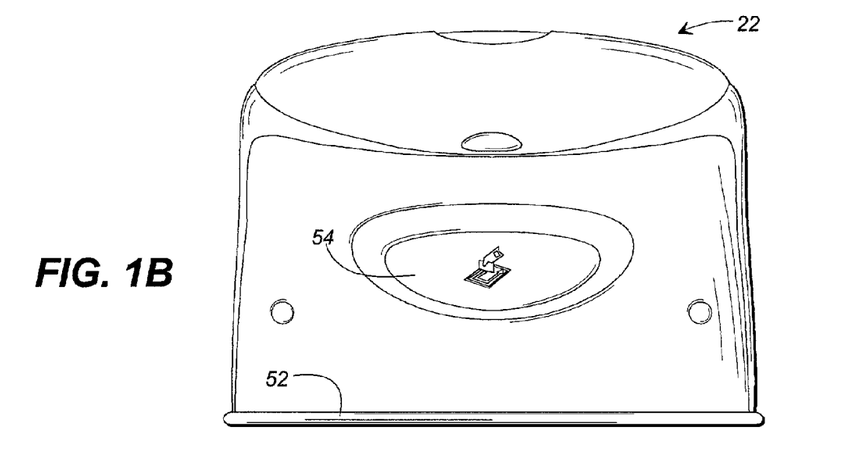
FIG. 1B is an elevation view of the appliance of FIG. 1A depicting the opposing side to that illustrated in FIG. 1A, which contains the capture button for performing an image capture.
Figure 1C:
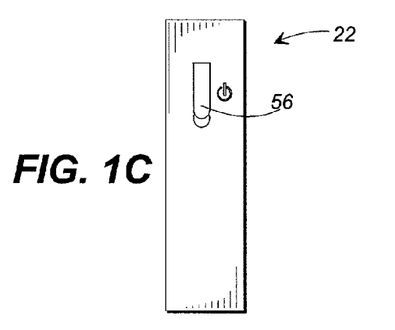
FIG. 1C is an elevation view of the appliance of FIGS. 1A and 1B depicting an end of the unit, which contains the power switch.
Figure 1D:
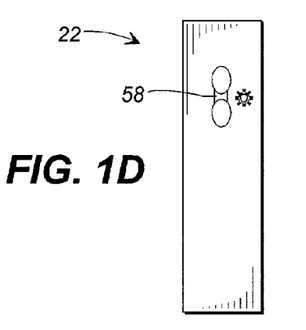
FIG. 1D is an elevation view of the appliance of FIGS. 1A, 1B, and 1C depicting the opposing end to that illustrated in FIG. 1C, which contains a brightness button for adjusting the visual clarity of the display screen.

FIG. 1B shows the side of appliance 22 opposite that illustrated in FIG. 1A (i.e., back). The back side of appliance 22 includes image capture button 54, which is depressed by a user to capture an image through photoelement array 52 and is released once the image is captured. A power switch 56 is included at one end of appliance 22 as shown in FIG. 1C and a brightness control 58 for display 24 is located at the other end of appliance 22 as shown in FIG. 1D. The positioning of the various buttons, power switch 56, and brightness control 58 on appliance 22 as shown in FIGS. 1A through 1D is merely exemplary and can be modified as needed to satisfy the ergonomic requirements of the targeted user community.

Figure 2:
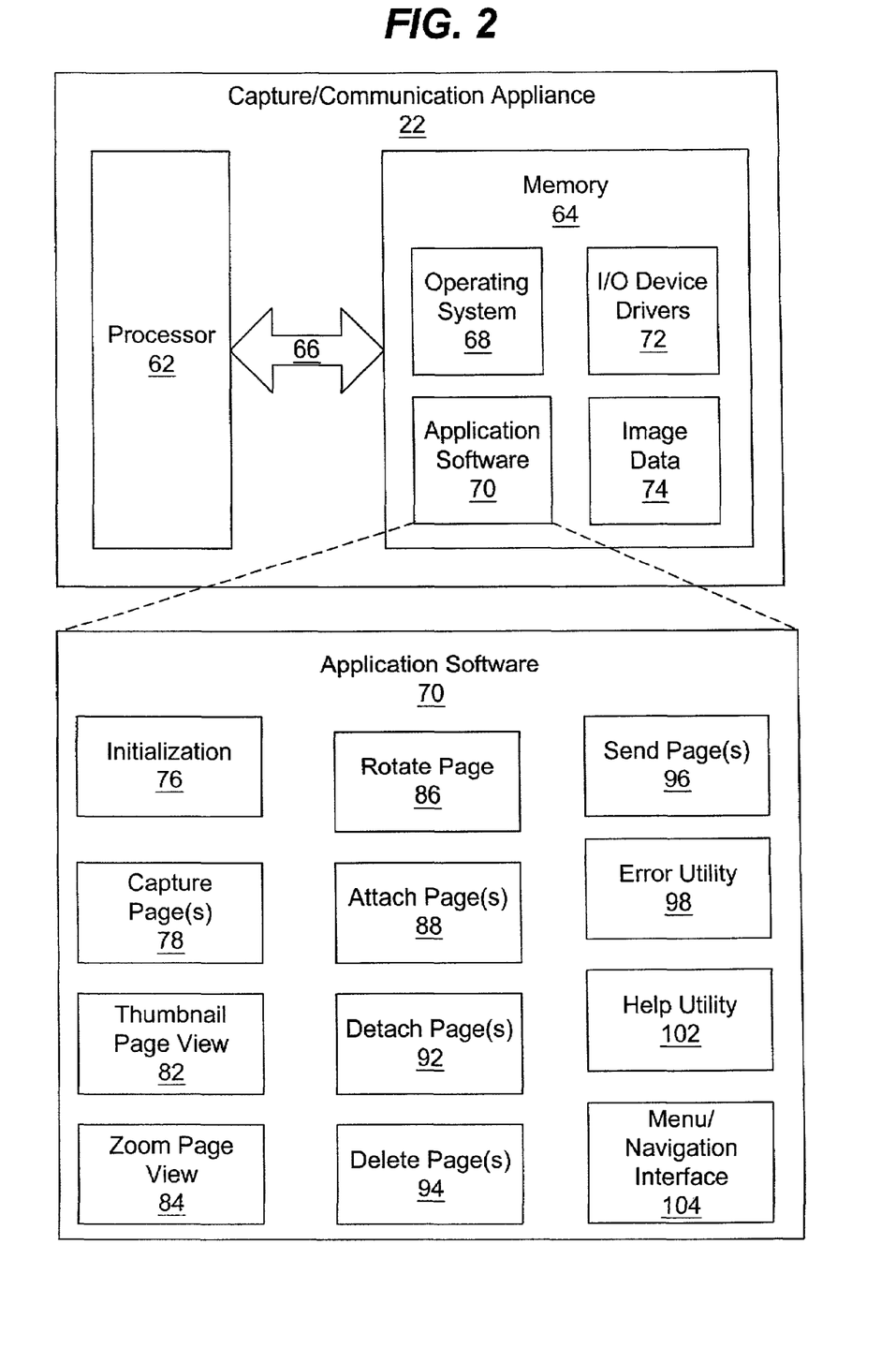
FIG. 2 is a high-level block diagram of the internal hardware and software architecture of the appliance illustrated in FIGS. 1A–1D.

Referring now to FIG. 2, the internal architecture of appliance 22 will be described hereafter. Appliance 22 includes a processor 62, which communicates with a memory 64 via address/data bus 66. Processor 62 can be any commercially available or custom microprocessor suitable for an embedded application. Memory 64 is representative of the overall hierarchy of memory devices containing the software and data used to implement the functionality of appliance 22. Memory 64 can include, but is not limited to, the following types of devices: cache, ROM, PROM, EPROM, EEPROM, flash, SRAM, and DRAM. As shown in FIG. 2, memory 64 holds four major categories of software and data used in appliance 22: the operating system 68; the application software 70; the I/O device drivers 72; and the image data 74 generated for each capture. Operating system 68 should be designed for real time embedded applications and, preferably, is relatively compact to make the most efficient use of memory 64. One such example of a real time operating system meeting these criteria is the PSOSYSTEM operating system (pSOSystem® or pSOS®) sold by Integrated Systems, Inc., 3260 Jay Street, Santa Clara, Calif. 95054-3309, which is used in the preferred embodiment of the present invention. I/O device drivers 72 include software routines accessed through operating system 66 by application software 70 to communicate with devices such as display 24, certain memory components 64 and I/O ports such as a serial port or infra red (IR) port for transferring data to another appliance, device or system. The digital representations of the images captured by appliance 22 is denoted by image data 74. The format used for storing the images should be compatible with application software 70. One common format used for encoding images is the CCITT standard, which is used in the preferred embodiment of the present invention; however, other public or proprietary standards can be used with equal success. For example, JPEG is a common standard used to encode graphic or color images. Finally, application software 70 comprises the control programs that implement the various features of appliance 22. Application software 70 and devices drivers 72 are typically written in a high-level programming language such as C or C++ for development convenience. Nevertheless, some drivers or application modules are sometimes written in assembly or machine language to optimize speed, memory usage or layout of the software in memory. In the preferred embodiment, the present invention uses C language to implement most application software 70 and device drivers 72. Assembly language is used to implement time-critical code segments.

Application software 70 can be broken into several modules corresponding to the various features of appliance 22, as shown in FIG. 2. These software modules include an initialization module 76, a capture page module 78, a thumbnail view module 82, a zoom view module 84, a page rotation module 86, an attach page module 88, a detach page module 92, a delete page module 94, a send page module 96, an error utility module 98, a help utility module 102 and a menu/navigation interface module 104. A brief overview of each of the aforementioned modules follows hereafter.

Figure 8A:
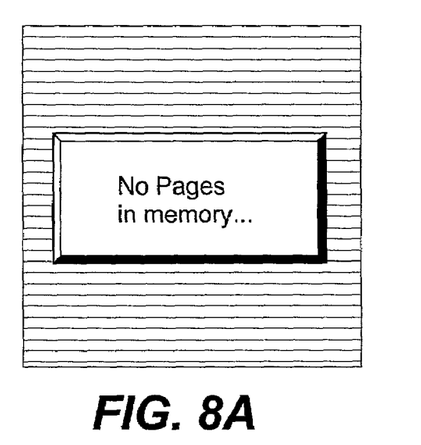
FIGS. 8A and 8B depict memory usage indicator icons on the display screen of FIG. 1A that provide a memory utilization report for the appliance.
Figure 8B:
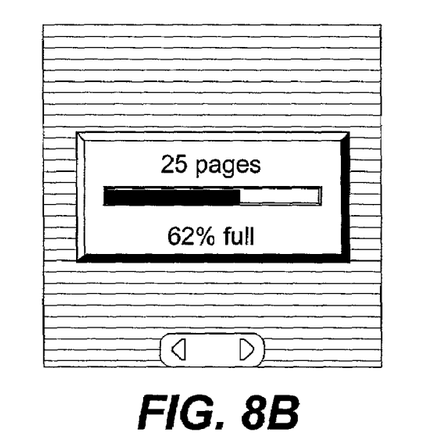
Figure 8C:
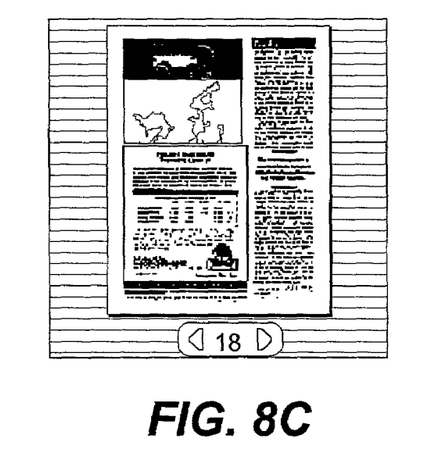
FIG. 8C illustrates a thumbnail view of a captured image on the display screen of FIG. 1A.
Figure 8D:
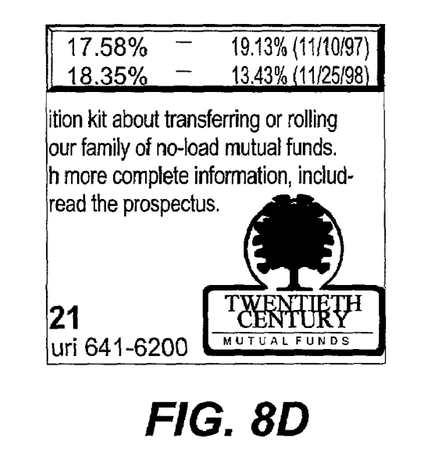
FIG. 8D illustrates a zoom view of a captured image on the display screen of FIG. 1A.

Initialization module 76 contains the boot software that is invoked when appliance 22 powers up. This module works closely with operating system 68 and device drivers 72 to perform any hardware initialization for processor 62, memory devices 64, display 24, and software initialization for global resources, such as message queues and buffers, system tasks, and memory partitions. Capture page module 78 controls the acquisition of images through photoelement array 52 and their conversion into a suitable format for storage in memory 64. Thumbnail view module 82 provides the default visual for pages and icons shown on display 24. For example, FIGS. 8A and 8B show a memory usage indicator icon for the cases where memory 64 is empty (i.e., no captured pages in memory) and where memory 64 holds 25 captured pages. In FIG. 8C, thumbnail view module 82 presents an entire page on display 24 as illustrated in FIG. 8C. Zoom view module 84 allows the user to magnify a portion of a page as illustrated in FIG. 8D. Page rotation module 86 allows the user to rotate a page either in thumbnail or zoom view in 90° increments. Attach page module 88 allows the user to logically join pages together to form a group of pages that can be manipulated as an individual unit. Conversely, detach page module 92 allows the user to separate a page or pages from a previously formed group. Delete page module 94 allows the user to purge a page or group of pages from memory 64. The operation of delete page module 94 will be discussed in detail hereinafter. Send page module 96 allows the user to transfer a page or group of pages to another appliance, device or system through the serial or IR communication ports of appliance 22. Error utility module 98 provides notification to the user when the user attempts an invalid operation. Help utility module 102 provides the user, in real time, with general instructions through text and animation for operating appliance 22 and context sensitive instructions for performing a specific operation. Lastly, menu/navigation interface module 104 provides the user with graphical menus for performing various operations and processes the user's response thereto. Moreover, menu/navigation interface module 104 responds to navigation buttons 42, 44, 46, and 48 that allow the user to steer a course through the graphical menus and view the stored pages.

Figure 3:
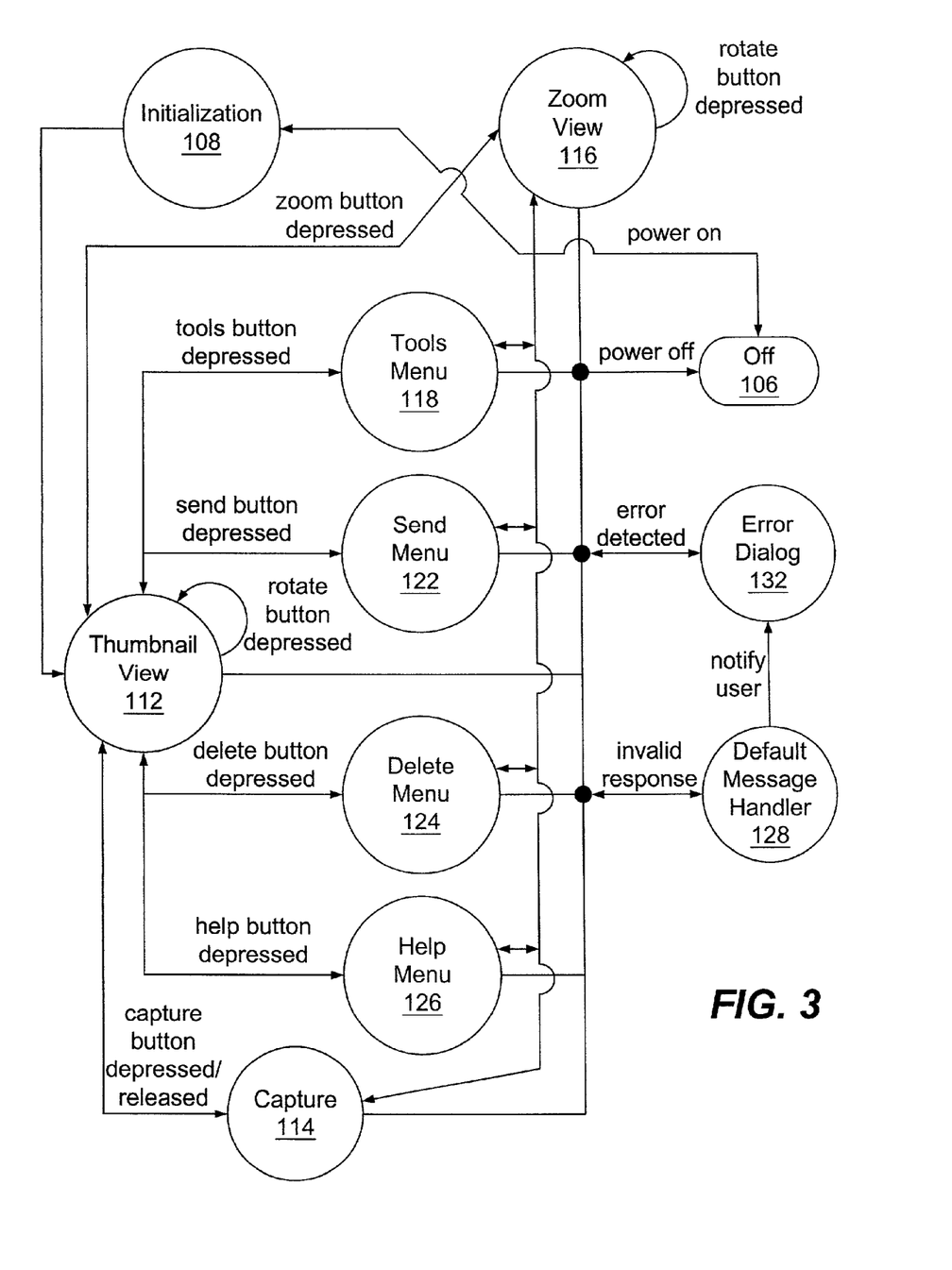
FIG. 3 is a high-level state diagram of the application software of FIG. 2.

A high level state diagram for application software 70 is shown in FIG. 3. This state diagram is useful for gaining a broad understanding of the operation of application software 70 and its associated software modules. These states are representative of tasks or processes in application software 70 that act on messages from a message queue, which are generated as a result of user interaction with appliance 22 (i.e., activation of buttons). Appliance 22 and application software 70 begin and terminate from the off state 106, which is controlled by the user through operation of power switch 56. Off state 106 can clearly be entered from any other state in response to a user turning appliance 22 off through switch 56. When a user turns switch 56 to the on position, the system will pass through a transient initialization state 108 during which time initialization module 76 is invoked to perform its functions. Once system initialization is complete, the system enters the thumbnail view state 112, which is the default state for viewing any captured images. From thumbnail view state 112, the system can transition to any one of several possible states depending on the action by the user. For example, the capture button can be pressed to enter capture state 114 to perform an image capture. After the image is captured, the button is released to return to thumbnail view state 112. If the user wishes to change the orientation of the captured image, then activation of rotation button 32 will rotate the captured image 90° with each invocation. Moreover, now that an image is captured in memory 64, a user can obtain a magnified view of a portion of the image or page by pressing zoom button 28 to enter zoom view state 116. Similar to thumbnail view state 112, the magnified image can also be rotated through application of rotation button 32. The system will return to thumbnail view state 112 through operation of zoom button 28.

Figure 4A:
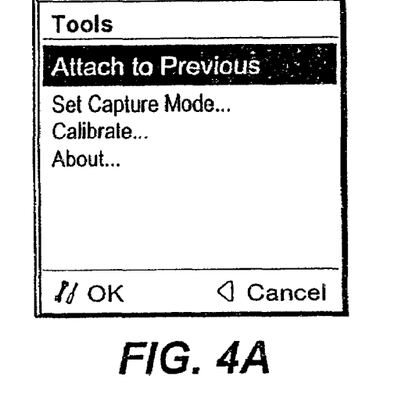
FIGS. 4A and 4B illustrate the tools menus displayed on the display screen of FIG. 1A.
Figure 4B:
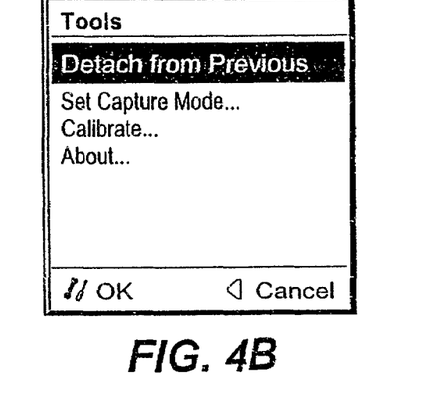
Figure 5:
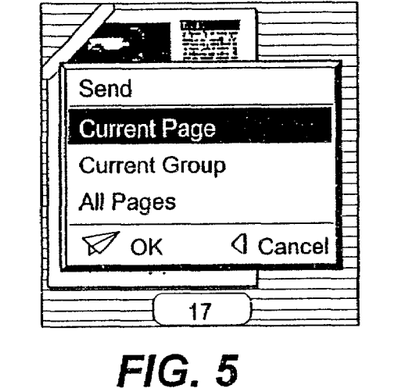
FIG. 5 illustrates the send menu displayed on the display screen of FIG. 1A.
Figure 6:
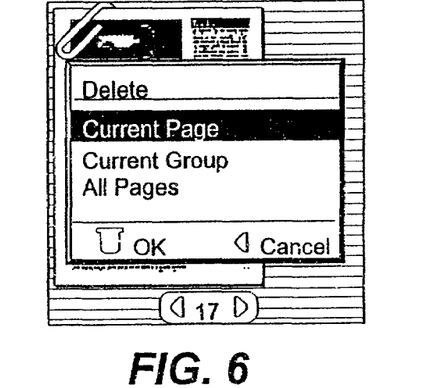
FIG. 6 illustrates the delete menu displayed on the display screen of FIG. 1A.
Figure 7:
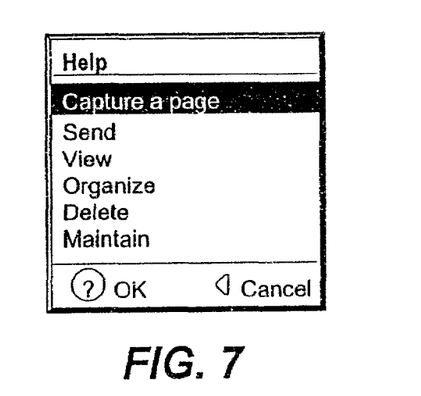
FIG. 7 illustrates the help menu displayed on the display screen of FIG. 1A.

From thumbnail view state 112 or zoom view state 116, one of four menu states can be entered depending on the choice made by the user. First, activation of tools button 38 will transition the system into tools menu state 118 where a menu of possible page operations and/or features is exhibited on display 24 as illustrated in FIGS. 4A and 4B. Second, activation of send button 26 will transition the system into send menu state 122 where a menu of options for transferring a page or group of pages to another appliance, device or system is exhibited on display 24 as illustrated in FIG. 5. Third, activation of delete button 34 will transition the system into delete menu state 124 where a menu of options for deleting a page or group of pages from memory 64 is exhibited on display 24 as illustrated in FIG. 6. Lastly, activation of help button 36 will transition the system into help menu state 126 where a menu of help topics is exhibited on display 24 as illustrated in FIG. 7. Once any of the aforementioned menu states is reached, the user can choose a desired menu option by using navigation buttons 42 and 44 and then validating the choice by pressing a confirmation button. In the preferred embodiment of the present invention, the confirmation button is simply the button by which the present menu on display is accessed. An icon indicating the appropriate confirmation button is displayed in the lower left hand side of the menus as illustrated in FIGS. 4 through 7. Menu states may be exited by simply invoking navigation button 46 to transition to a previous state.

An invalid response by the user (i.e., user presses an inactive button) will result in a transition to the default message handler state 128 where the user response is interpreted through the message that was generated internally. Frequently, the invalid response by the user will simply be ignored. Nevertheless, depending on the button that was invoked and the current state of application software 70, a transition is sometimes made to the error dialog state 132 to notify the user of their error via a message or graphic (e.g., a blinking icon) on display 24. Alternatively, error dialog state 132 can be entered directly if application software 70 detects an error in the execution of a valid operation. The most common example of this is when the user follows an improper capture path with appliance 22 during the image capture process.

Figure 9A:
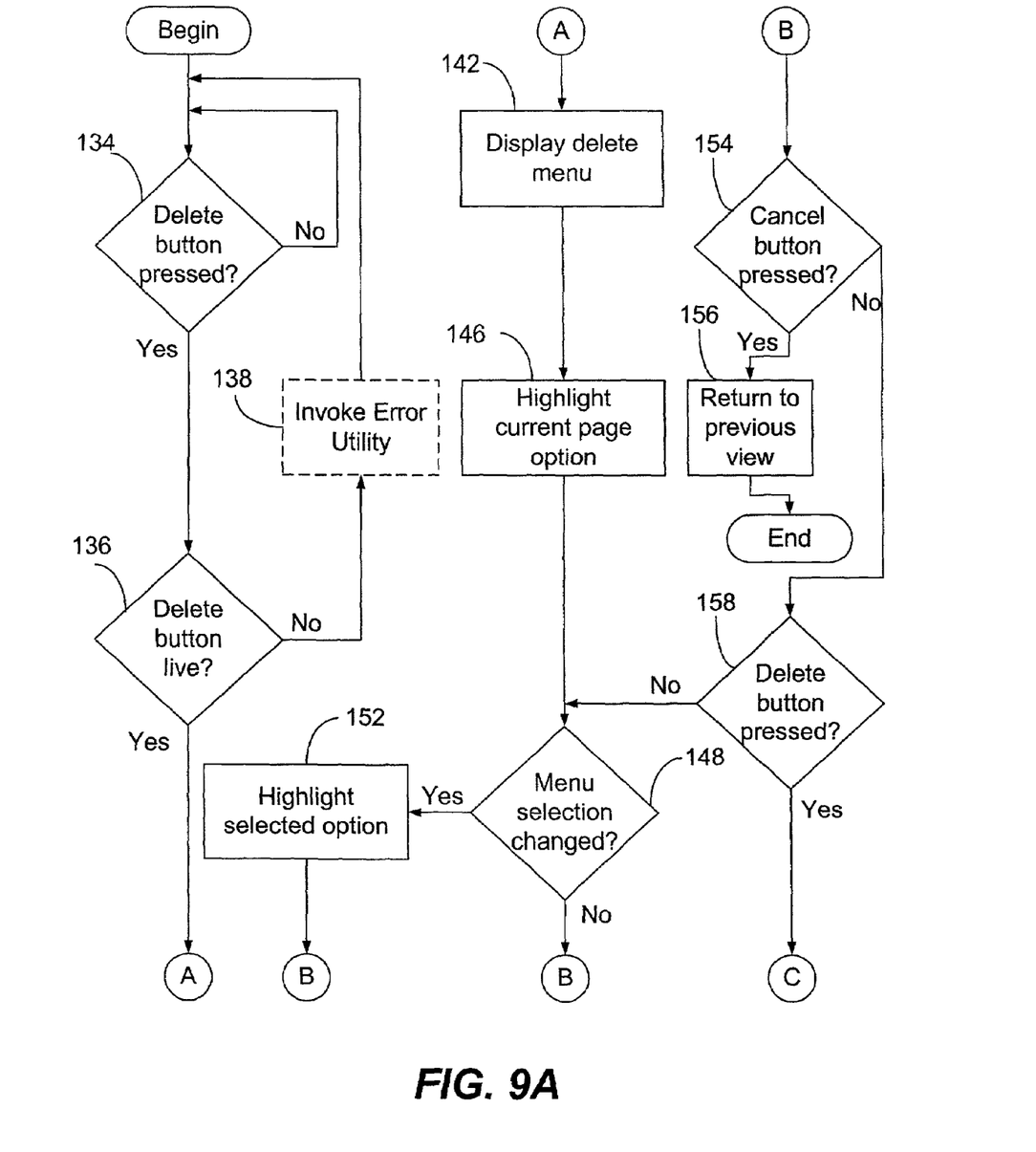
FIGS. 9A, 9B, and 9C are a flow chart describing the operation of the delete page module of FIG. 2.

The features provided by the delete page software module 94 will be described hereafter with frequent reference to (a) the architecture and operation of the application software 70 of FIG. 2; (b) the delete menu and confirmation prompt of FIGS. 6 and 10; and (c) the flow charts of FIGS. 9A, 9B, and 9C.

Operation of the Delete Page Feature

The delete page feature of appliance 22 is exercised through delete button 34, which displays the delete menu illustrated in FIG. 6. Thus, as represented by decision diamond 134 in FIG. 9A, the process begins with menu/navigation interface module 104 (see FIG. 2) processing a message indicating that delete button 34 has been activated. Depending on the current state of application software 70, this response may not be valid as indicated by decision diamond 136. If delete button 34 is not currently active or live, error utility software module 98 may optionally be invoked to notify the user that delete button 34 is presently inactive in step 138. If, however, delete button 34 is active, the process continues by following termination A where the delete page menu is exhibited on display 24 (see FIG. 1A) in step 142 as shown in FIG. 6. The current page option is highlighted as the default action in step 146 as depicted in FIG. 6.

Referring now to FIG. 6, three delete page options are offered to the user: delete the current page, delete the current group, or delete all pages stored in memory 64 (see FIG. 2). The first option of deleting the current page, which is chosen as the default in the preferred embodiment, allows the user to delete whatever page is currently displayed on display 24 (see FIG. 1A). Thus, whether the current page is displayed in thumbnail view (e.g., FIG. 8C), is displayed in zoom view (e.g., FIG. 8D), is the inner page of a group of pages (e.g., FIG. 5) that have been logically joined through attach page module 88 (see FIG. 2), or is the first page of a group of pages, that page will be selected for deletion. The second option allows the user to delete the group of pages of which the current page displayed on display 24 is a member. The entire group will be deleted irrespective of whether the current page on display is the first or an inner page of the group. Finally, the third option allows the user to delete all pages stored in memory. This option can be used even if no page is currently on display, such as the example shown in FIG. 8B where the memory usage indicator icon is displayed.

The delete menu options discussed in the foregoing are used in the preferred embodiment of the present invention. Nevertheless, alternative delete options can be used to adapt to changing or differing user preferences. For example, a skilled programmer may wish to design application software 70 such that a user could electronically tag or mark pages stored in memory 64 by pressing a button when they are displayed. A fourth option could then be added to the delete menu of FIG. 6 allowing the user to delete those tagged or marked pages when delete page module 94 (see FIG. 2) is invoked through delete button 34.

Returning now to FIG. 9A, the user can choose between the aforementioned delete options using navigation buttons 42 and 44 (see FIG. 1A) as indicated by decision diamond 148. As the user moves between options, the currently selected option will be highlighted in step 152. Once a selection is made, the delete process continues at termination B. As shown in FIG. 6, options from the delete menu can be confirmed using delete button 34 or the menu can be exited through activation of navigation button 46. Thus, at decision diamond 154, if the delete menu is exited, the delete process ends at step 156 by removing the menu from display 24 and returning the display to the previous view (i.e., the view on display prior to invocation of delete button 34). Otherwise, if an option is confirmed through invocation of delete button 34, control will be transferred to delete page module 94 at decision diamond 158.

Figure 9B:
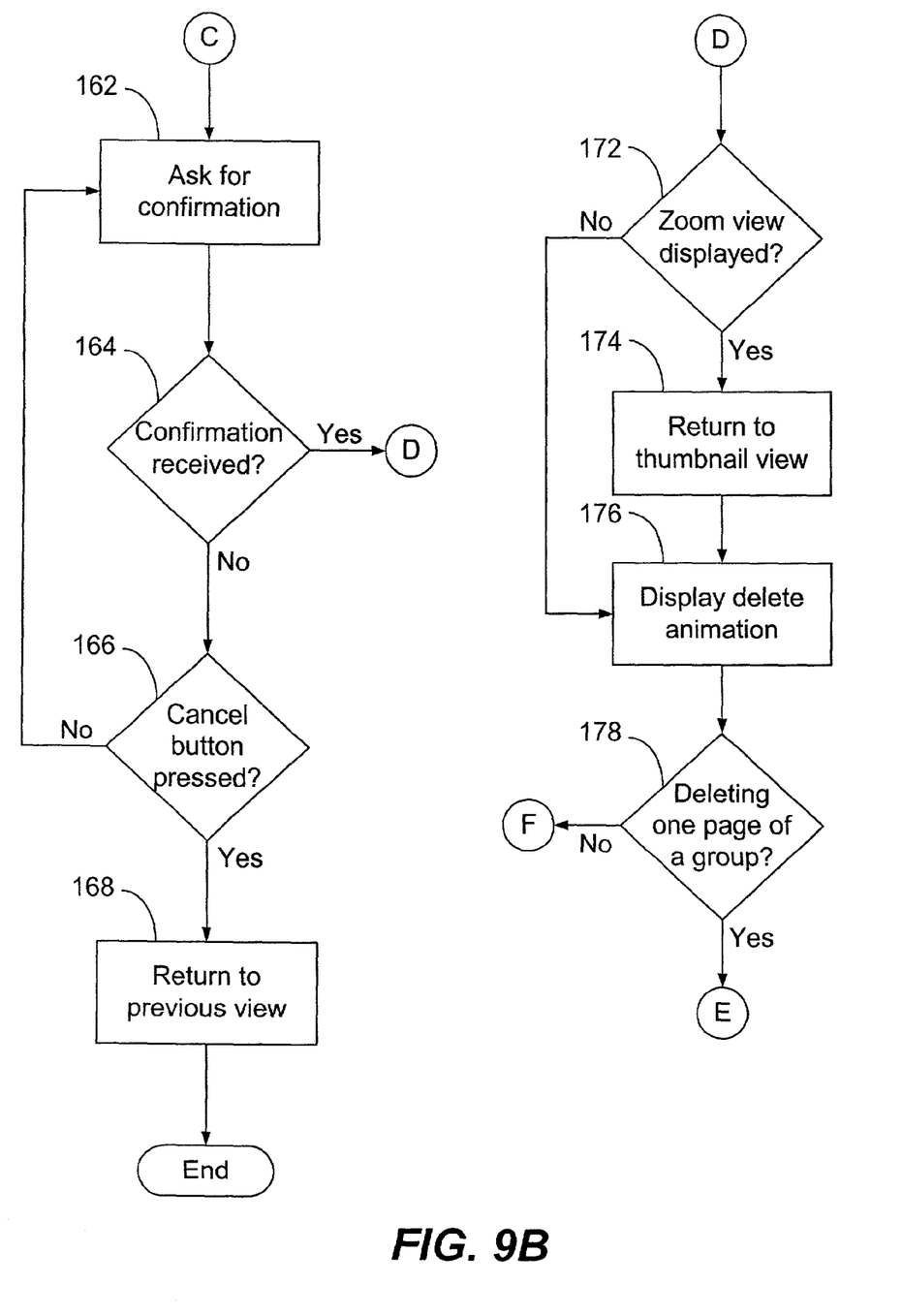
Figure 10:
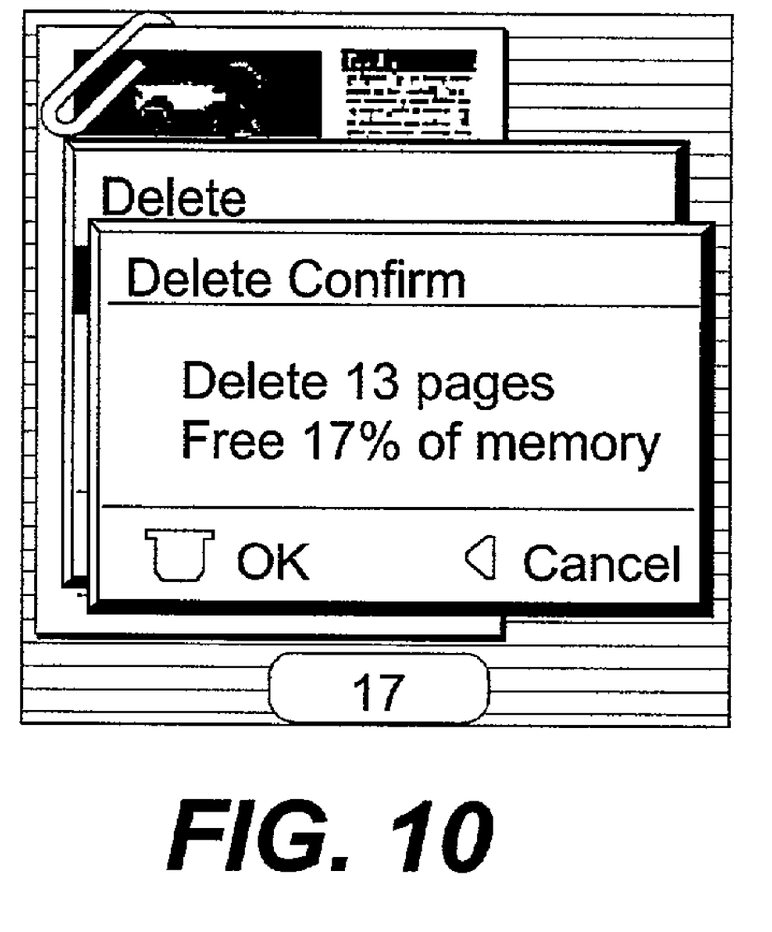
FIG. 10 illustrates a delete confirmation prompt displayed on the display screen of FIG. 1A.

Following termination C in FIG. 9B, delete page module 94 in step 162 displays a delete confirmation prompt on display 24 as shown in FIG. 10, which provides the user with a second opportunity to abort the delete operation. The delete confirmation prompt depicted in FIG. 10 is in response to a delete selection (see FIG. 6) and informs the user how many pages will be deleted and the percentage of memory that will be freed once the deletion is completed. While use of the confirmation prompt is not required, it is recommended because of the design paradigm followed in the preferred embodiment. To preserve memory resources in appliance 22, once an image or page has been deleted it is permanently erased from memory and cannot be retrieved later. Alternative designs can be implemented by the skilled programmer, however, that provide additional protection from an inadvertent page deletion. For example, delete page module 94 could be designed to store deleted pages in memory 64 (see FIG. 2) in a deleted page list or other suitable data structure. Once a page is deleted, this would be represented by a metaphor of placing the page in a garbage or trash can. Nevertheless, deleted pages that have been symbolically placed in the trash can could still be recovered through an option provided on the delete menu of FIG. 6. To permanently delete a page, another option could be provided on the delete menu of FIG. 6 to, in effect, empty the trash can. Emptying the can causes the pages that are held on the deleted page list or data structure to be permanently erased from memory 64. A drawback to this design, however, is that users may fail to empty the trash can to purge deleted pages from memory with sufficient frequency. As a result, memory resources may rapidly be exhausted. Because memory is a valuable commodity in the small embedded system used to control appliance 22, the selected page or pages will be permanently deleted from memory provided a positive confirmation is received through a third invocation of delete button 34 at decision diamond 164.

The user can abort the delete operation by activating navigation button 46 at decision diamond 166. If the delete menu is exited, the delete process ends at step 168 by removing the confirmation prompt of FIG. 10 and the underlying delete menu of FIG. 6 from display 24 and returning the display to the previous view (i.e., the view on display prior to invocation of delete button 34). Otherwise, if the delete operation is confirmed at decision diamond 164, the delete process continues at termination D.

If a page or group of pages to be deleted are currently displayed in zoom view on display 24 as shown in FIG. 8D, delete page module 94 determines this at decision diamond 172 and returns the display to the thumbnail view depicted in FIG. 8C in step 174. With the page or group of pages in thumbnail view, delete page module 94 permanently deletes the selected page or group of pages in step 176 and conveys this operation to the user through the use of an animation. According to the preferred embodiment, the delete animation shows the selected page or pages to be deleted turning to ash starting from the bottom of the page or pages and continuing to the top. The ashes are then shown to fall to the bottom of display 24 where they disappear from the display. Ashes are chosen as a metaphor for the delete operation in the preferred embodiment because they convey to the user the notion that the page or group of pages are permanently deleted. That is, it would be impossible to reconstruct a page burned to the point that only ashes remain. Similarly, it is impossible to recover a page or group of pages that have been purged from memory 64 through the delete feature of the present invention. Alternative animation scenes or even textual dialogs can be used to communicate the concept to the user that the delete operation is permanent without departing from the scope of the present invention. In choosing an alternative animation, emphasis should be placed on selecting a metaphor that conveys the irreversibility of the delete feature.

After the animation completes, display 24 is updated according to the particular page or group of pages that was deleted. For example, if a single page in a group of pages was deleted as represented by decision diamond 178, the delete process continues at termination E of FIG. 9C. If the deleted page happened to be the last page in the group as represented by decision diamond 182, the new last page becomes the current page displayed on display 24 in step 184. Otherwise, the following or subsequent page in the group becomes the current page on display in step 186.

Figure 9C:
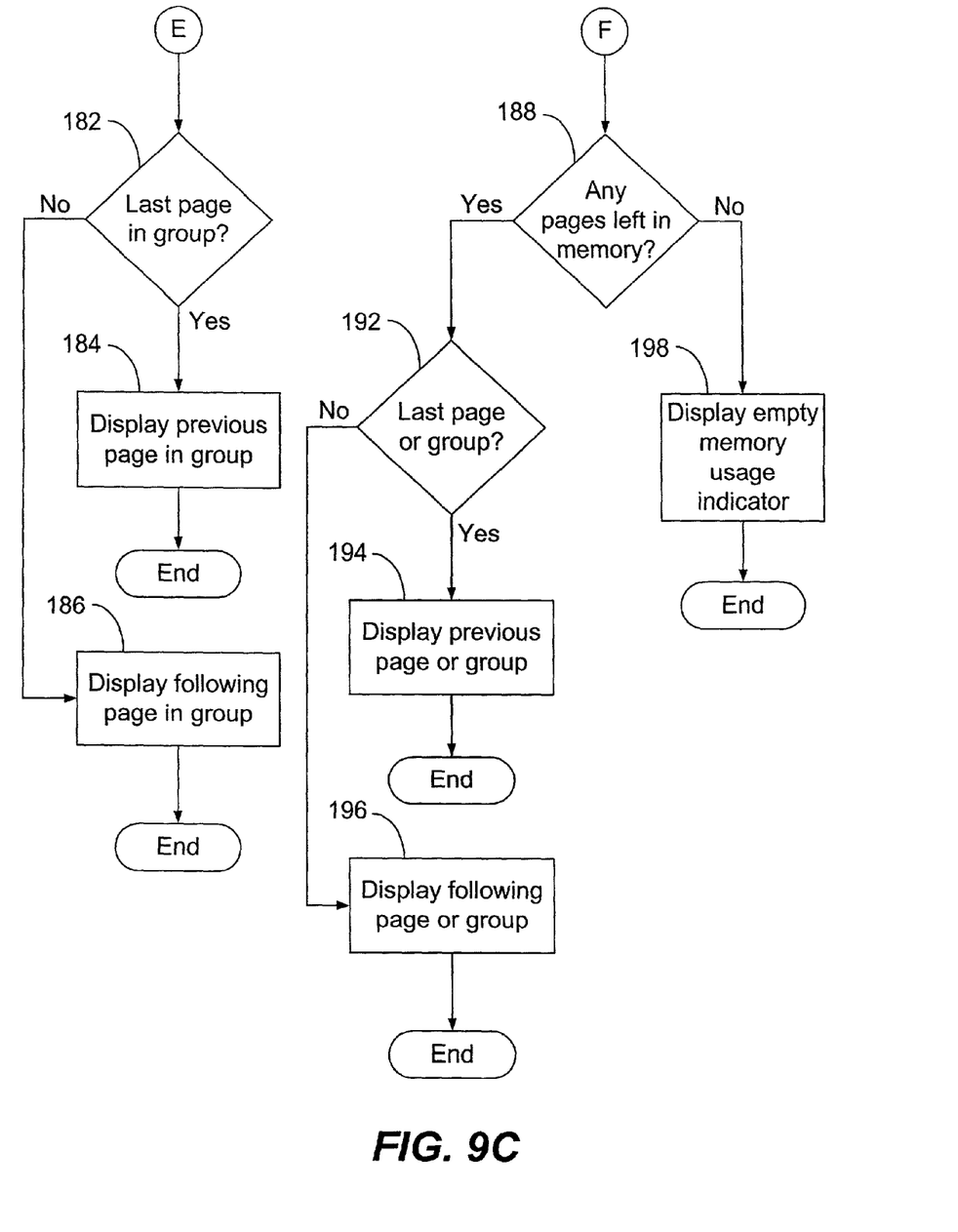

If the delete operation was not performed on a single page of a group, the delete process continues at termination F of FIG. 9C. A determination is made by delete page module 94 at decision diamond 188 whether the delete operation purged memory 64 of all pages. This would occur if the all pages option was chosen from the delete menu of FIG. 6 or if the single page or group of pages deleted were the only remaining pages. If pages remain in memory 64 after the delete operation is performed, the delete process follows a similar sequence to that described hereinbefore following termination E. If the deleted page or pages happened to be the last logical page or group as represented by decision diamond 192, the new last page or group (i.e., page or group logically preceding the deleted page or group) is displayed on display 24 in step 194. Otherwise, the following or subsequent page or group is displayed in step 196.

Finally, if it is determined at decision diamond 188 that all images have been purged from memory 64, then the empty memory usage indicator of FIG. 8A will be displayed on display 24 in step 198 to inform the user that appliance 22 no longer contains any captured images.

It is important to emphasize that while the present invention has been illustrated herein with reference to an image capture and communication appliance, the GUI and human-machine interface features of the present invention are applicable to any device or appliance that stores information as data entities or files. Examples of such devices include digital cameras, video recording devices (e.g., video stored in digital form), audio recording devices (e.g., audio stored in digital form), portable fax machines, desktop, laptop, and hand-held computing devices. Furthermore, it is envisioned that the methods disclosed herein for deleting image data can likewise be used in any device or appliance that stores data as logical entities.

Application software 70, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The principles of the present invention have been disclosed herein as embodied in a portable, hand-held image capture and communication appliance that provides the flexibility of traditional hand-held scanners yet offers an array of intelligent features not heretofore known in the art. For example, the capture and communication appliance includes a delete page or image feature that is accompanied by an animation to convey to the user that once a page is deleted, it cannot be recovered. For protection against inadvertent image deletion, the user is provided with a confirmation prompt before a delete request is carried out. In addition, a GUI is provided that allows even a novice user to successfully operate the appliance with minimal or no outside instruction. It is these intelligent features that place the present invention in a new class of products known as electronic information appliances that merge the functionality of electronic peripheral devices, such as image scanners, with the processing capabilities and graphical interface used in computers.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A digital camera, comprising:
   a photoelement array for capturing image data;
   a memory for saving said image data;
   a processor in communication with said memory;
   a display in communication with said processor for exhibiting said image data; and
   program code stored in said memory and executed by said processor, said program code comprising a delete page module for purging said image data from said memory, said program code further comprising a first code segment for displaying an animation on said display, wherein said animation is a metaphor for an irreversible deletion of said image data from said memory, said first code segment further comprising a code segment for displaying a delete confirmation prompt on said display, said delete confirmation prompt including a display of a percentage of said memory to be made available on said display when said image data is purged from said memory.

2. The digital camera of claim 1, wherein said program code further comprises:
   a second code segment for displaying valid appliance operations on said display based on a current state and processing any response thereto.

3. The digital camera of claim 1, wherein said metaphor is a page of said image data turning into ash.

4. The digital camera of claim 1, wherein said first code segment further comprises:
   a third code segment for displaying a number of pages of said image data to be purged from said memory on said display.

5. The digital camera of claim 1, further comprising:
   means for communicating image data to a remote appliance.

6. A digital camera, comprising:
   capturing means for acquiring image data;
   storage means for saving said image data;
   processing means in communication wit said storage means;
   display means in communication with said processing means for exhibiting said image data; and
   program code stored in said storage means and executed by said processing means, said program code comprising;
   a delete page module for purging said image data from said storage means, said delete page module comprising;
   a first code segment for displaying an animation on said display, wherein said animation is a metaphor for an irreversible deletion of said image data from said storage means; and
   a second code segment for displaying a delete confirmation prompt on said display, said delete confirmation prompt including a display of a percentage of said memory to be made available on said display when said image data is purged from said memory; and
   a menu module for displaying valid appliance operations on said display based on a current state and processing any response thereto.

7. The digital camera of claim 6, wherein said first code segment further comprises:
   a third code segment for displaying a number of pages of said image data to be purged from said storage means on said display means.

8. The digital camera of claim 6, wherein said metaphor is a page of said image data turning into ash.

9. The digital camera of claim 6, further comprising:
means for communicating image data to a remote appliance.

10. A method for purging image data from a digital camera, comprising the steps of:
capturing image data on a photoelement array in the digital camera;
saving the image data in a memory;
implementing a processor to communicate with said memory;
exhibiting the image data on a display in communication with the processor;
executing program code stored in said memory by the processor, wherein the program code operates to purge the image data from the memory;
displaying an animation on the display corresponding to a delete function, wherein the animation is a metaphor for an irreversible deletion of the image data from the memory;
displaying a delete continuation prompt on the display; and
displaying a percentage of said memory to be made available on the display when the image data is purged from said memory.

11. The method of claim 10, wherein the metaphor is a page of the image data turning into ash.

12. The method of claim 10, further comprising the step of:
displaying valid appliance operations on the display based on a current state; and
implementing the processor to process a response to the appliance operations.

13. The method of claim 10, further comprising the step of:
displaying a plurality of pages of said image data to be purged from the memory on the display.

14. The method of claim 10, further comprising the step of:
communicating image data to a remote appliance.

* * * * *

UNITED STATES PATENT AND TRADEMARK OFFICE
CERTIFICATE OF CORRECTION

PATENT NO.        : 7,079,181 B2
APPLICATION NO.   : 10/061061
DATED             : July 18, 2006
INVENTOR(S)       : James C. Dow et al.

It is certified that error appears in the above-identified patent and that said Letters Patent is hereby corrected as shown below:

On the face page, in field (56), under "Other Publications", in column 2, line 2, after "Press." delete "MeFedries, Paul, "WIndows 98 Unleashed", May 12, 1998, Sams Publishing.".

In column 2, line 25, delete "modem" and insert -- modern --, therefor.

In column 3, line 10, after "appliance" insert -- , which, as a non-limiting example, may be a digital camera, --.

In column 12, line 39, in Claim 6, delete "wit" and insert -- with --, therefor.

In column 12, lines 44-45, in Claim 6, delete "comprising;" and insert -- comprising: --, therefor.

In column 12, lines 47-48, in Claim 6, delete "comprising;" and insert -- comprising: --, therefor.

In column 13, line 20, in Claim 10, delete "continuation" and insert -- confirmation --, therefor.

Signed and Sealed this

Third Day of November, 2009

David J. Kappos
*Director of the United States Patent and Trademark Office*